Oct. 8, 1963   W. STIEFELMEIER   3,105,973
METHOD OF MAKING PIPED OPENINGS FOR POCKETS OR THE LIKE
Filed Oct. 29, 1959   6 Sheets-Sheet 1
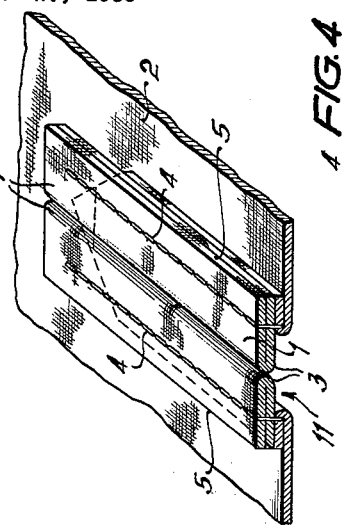
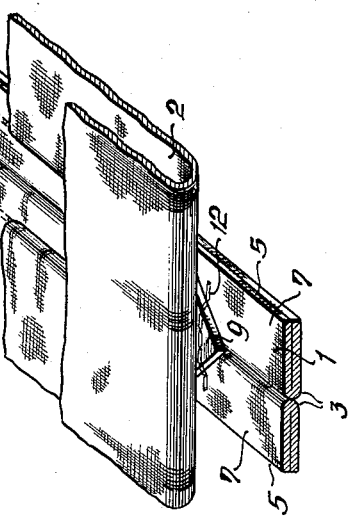
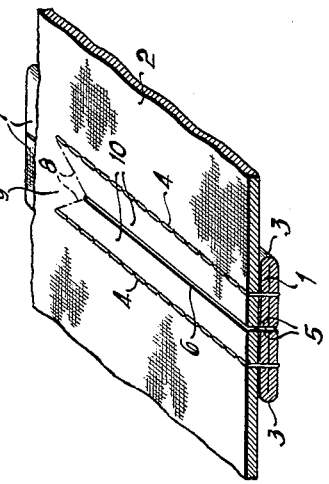
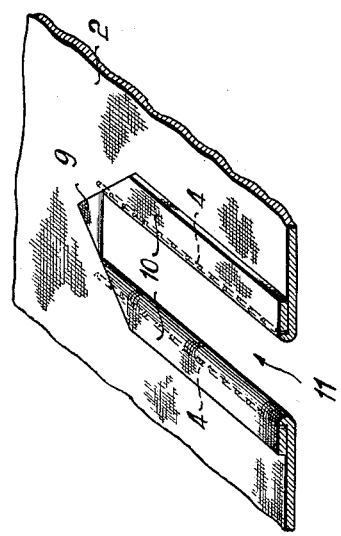
INVENTOR
WILHELM STIEFELMEIER
BY Robert H. Jacob
AGT.

Oct. 8, 1963 W. STIEFELMEIER 3,105,973
METHOD OF MAKING PIPED OPENINGS FOR POCKETS OR THE LIKE
Filed Oct. 29, 1959 6 Sheets-Sheet 2
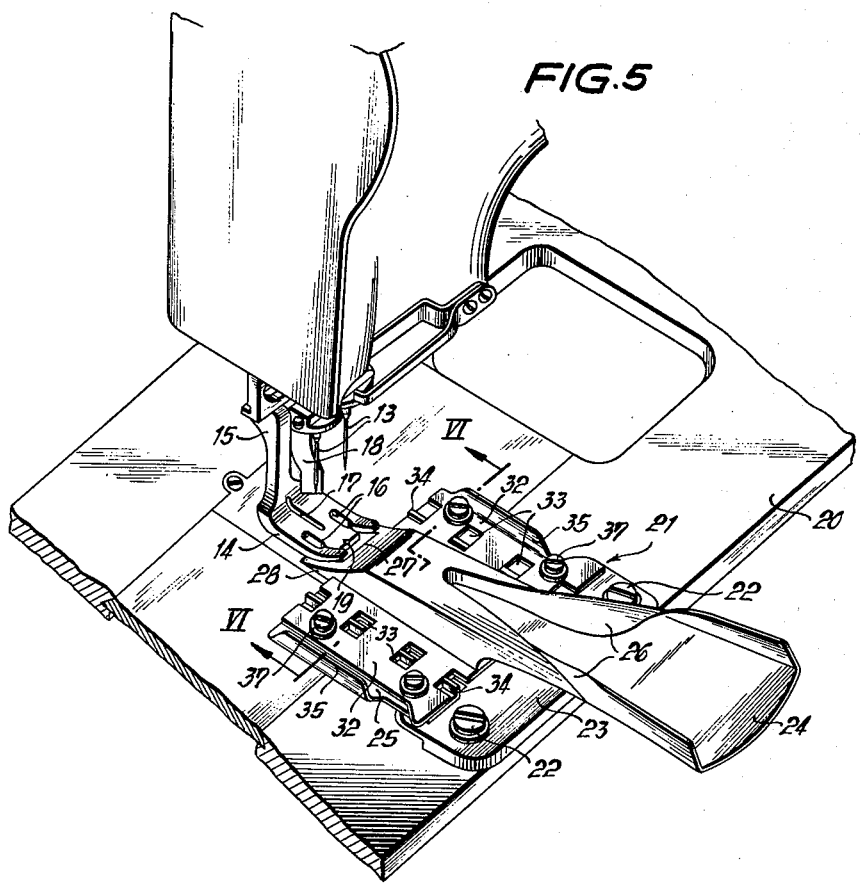
FIG. 5
FIG. 6
INVENTOR
WILHELM STIEFELMEIER
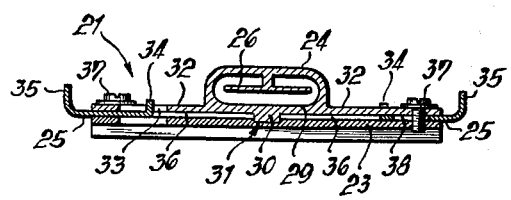
AGT.

Oct. 8, 1963 W. STIEFELMEIER 3,105,973
METHOD OF MAKING PIPED OPENINGS FOR POCKETS OR THE LIKE
Filed Oct. 29, 1959 6 Sheets-Sheet 3

INVENTOR
WILHELM STIEFELMEIER

Oct. 8, 1963  W. STIEFELMEIER  3,105,973
METHOD OF MAKING PIPED OPENINGS FOR POCKETS OR THE LIKE
Filed Oct. 29, 1959  6 Sheets-Sheet 4
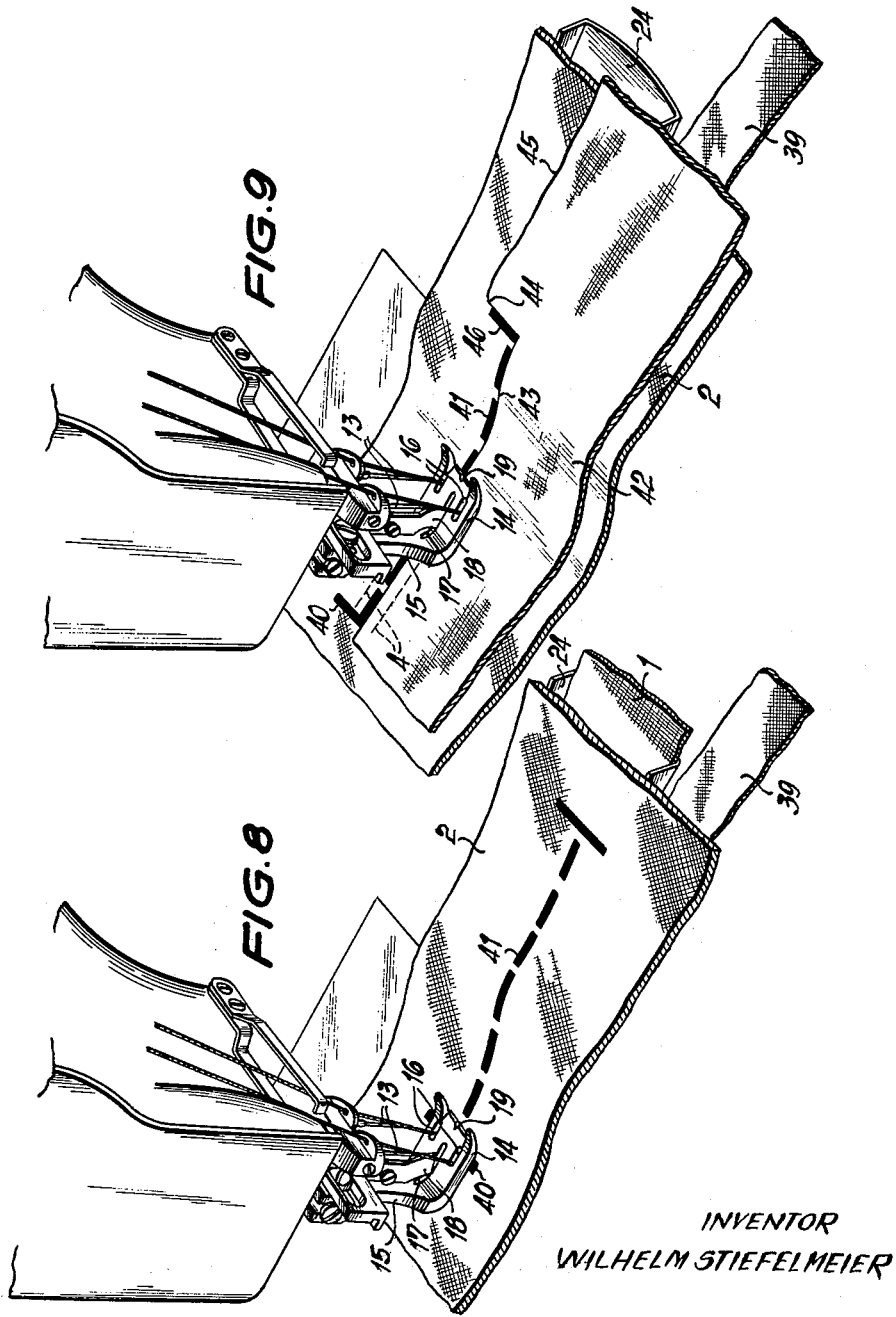
INVENTOR
WILHELM STIEFELMEIER

INVENTOR
WILHELM STIEFELMEIER

Oct. 8, 1963  W. STIEFELMEIER  3,105,973
METHOD OF MAKING PIPED OPENINGS FOR POCKETS OR THE LIKE
Filed Oct. 29, 1959  6 Sheets-Sheet 6
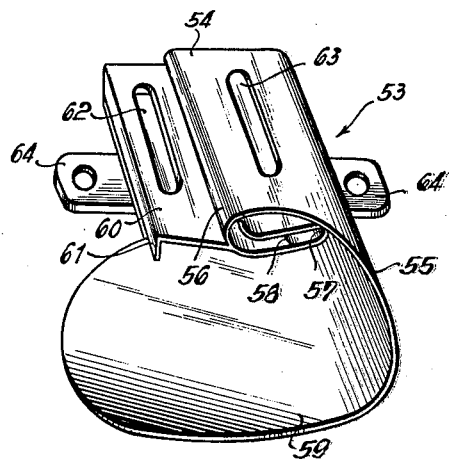
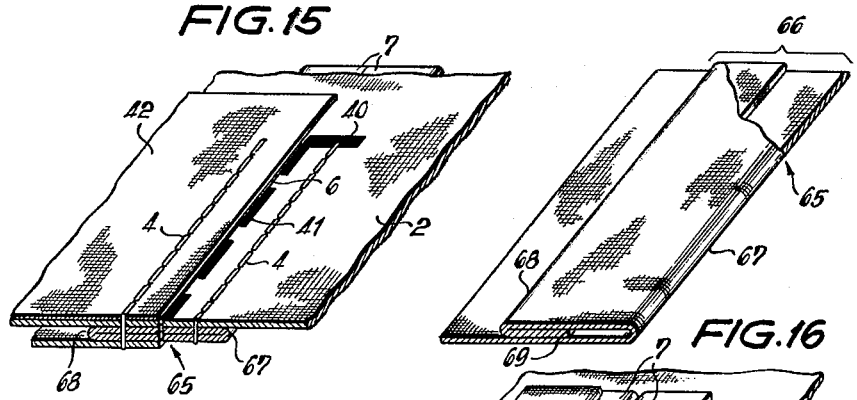
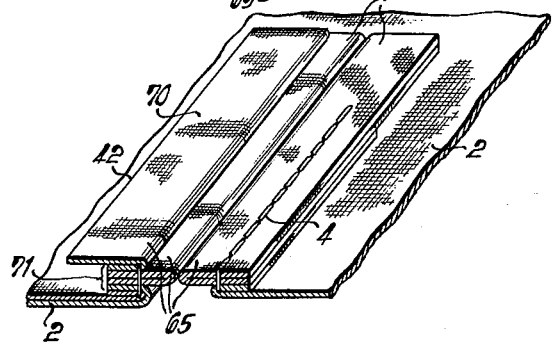
INVENTOR
WILHELM STIEFELMEIER
BY Robert H. Jacob
AGT.

United States Patent Office 3,105,973
Patented Oct. 8, 1963

3,105,973
METHOD OF MAKING PIPED OPENINGS FOR POCKETS OR THE LIKE
Wilhelm Stiefelmeier, Kaiserslautern, Germany, assignor to G. M. Pfaff Ag, Kaiserslautern, Germany
Filed Oct. 29, 1959, Ser. No. 849,581
Claims priority, application Germany Nov. 5, 1958
4 Claims. (Cl. 2—247)

The invention relates to a method and apparatus for making piped bound openings in pre-cut parts of garments and the like by means of a sewing machine operating with two needles and where a vertical cutting device is arranged between the needles.

Piped openings have hitherto been produced mainly by means of three methods. The first method, which is still very widely used in the sewing industry, uses a single needle sewing machine for sewing on the piping, by which the portions of piping are sewn on the right and left side of the slit. This method is cumbersome and time consuming and the individual portions of piping can be aligned accurately relative to the slit only with very great difficulty.

A new method has become popular in the sewing industry particularly for piped button holes, whereby piped openings of identical size are formed fully automatically. In this case, the entire operation of manufacture is effected by a special group stitch sewing machine. This machine, however, is not only complicated in construction and expensive, but it is not at all suitable, or only very slightly so, for making long piped openings such as, for example, pocket slits. Furthermore, it does not afford the possibility of making piped openings of different length in rapid succession.

With the third method which utilizes a two-needle sewing machine having a vertical cutting device arranged between the needles and a material folding apparatus, a folded strip of cloth or leather, the so-called piping, is sewn to the front side of the cut garment-part by two seams extending parallel to the folding edges while simultaneously cutting through the intermediate layers of the parts of material. After the sewing operation the covering material is completely cut through by hand in an extension of the cutting line. Furthermore, the ends of the slit in the cut out garment-part are provided with two incisions dliverging with respect to the ends of the seam whereupon the parts of material between the lines of the seam, including the unsewn ends of the piping, are drawn through the slit on to the back of the cut out garment-part.

When operating in accordance with this third method, the piping material is folded to a T profile in such manner that the upwardly projecting ends of piping material after being drawn through the cut slit overlap the cut edges of the material. The transition from the turned over edge to the cut out part therefore has a compensating effect and the finished piped opening has a good appearance. In this method, however, due to the projecting ends, the piping material must be sewn from above onto the outside of the cut out garment-part. The folding apparatus is pivotably mounted on the head of the sewing machine or is made as an integral part of the presser foot. Consequently it is located above the cut out garment-part and conceals in the same manner as the piping which is also being fed through the machine, the view of the guide marks on the cut out garment-part, thus making it impossible to work accurately when sewing. Furthermore, it is very difficult to feed and at the same time sew a pocket lining exactly under the cut out garment-part during the piping of pocket slits.

A method is also known in which the piping material is folded flat by means of a folding apparatus, while the turned-over edges are firmly sewn. Then, in a second operation the folded piping is sewn to the cut out garment-part by means of a two-needle sewing machine, whereupon, in a third operation, the cutting of the piped opening is finally effected.

It is an object of the present invention to overcome the aforementioned difficulties by providing a method and apparatus for sewing on and severing the piping rapidly and very accurately, according to markings already made, without the use of complicated and expensive means.

In accordance with the present invention the fixing seams are made on a two-needle sewing machine provided with a cutter arranged between the needles while the cut out garment-part is disposed above the piping and the position of the folding edges of the piping is determined relative to each other and relative to the cut out shape, as the slit is also cut in a single operation of the two-needle sewing machine.

It is a further object of the present invention to afford a clear view at any time of the stitch-forming position and to determine exactly the starting location of the sewing and cutting implements.

According to a further feature of the invention, when in the manufacture of piped pockets, the fixing seams of the piping material are being sewn, a pocket lining is also manually guided on the free side of the cut out garment-part, with the result that one edge of material lies on the cutting line and an edge of a strip jointly sewn under the piping by one of the two needles lies between the seam produced by this needle and the cutting line. After being drawn through the slit, this strip overlaps the cutting edge, against which the pocket lining is disposed.

Preferably the apparatus for carrying out the new method of manufacturing piped pocket openings is provided not only with a folding-sleeve for folding the piping material, but for guiding the strip or tape, it is also provided with a bridge secured along the center line under the base of the folding-sleeve which in conjunction with a slide, arranged at a distance therefrom and parallel thereto, aligns an extension plate, mounted in the horizontal plane of the base of the folding-sleeve and parallel with a base plate carrying the apparatus.

The slide can be displaced in parallel direction in that on the side opposite the bridge it is provided with at least two projections bent at a right angle and engaging in corresponding openings in the extension plate. These openings are much longer transversely to the sewing direction than the thickness of the engaging projections and the free length of these openings correspond to the free length of longitudinal slits arranged in the slide parallel thereto, for receiving fixing screws between the extension plate and the base plate.

The invention is not limited to strip material for the piping, but in accordance with another embodiment, the marginal zone of a piece of material can fulfil the same purpose, in that the edge of material resulting from the double folding of this marginal zone in the same direction and lying between the folded edges, is located between the two seams, while the other extends beyond the folded edges.

Further features of the invention and details of the advantages achieved thereby will become apparent from the embodiments of the new method illustrated in the drawings in which:

FIGURE 1 is a perspective view, partly in section of the cut out garment-part with the folded piping sewn below it.

FIGURE 2 shows the same parts as in FIGURE 1, after the sewn and cut piping material is drawn upwardly through the cut slit and turned over on both sides.

FIGURE 3 is a view similar to that of FIGURE 2, with the piping omitted for greater clarity.

FIGURE 4 is a perspective view of the piped opening showing the locking of the obliquely cut end of the slit with the ends of the piping.

FIGURE 5 is a perspective view of the head of the sewing machine with the folding apparatus mounted on the material carrying plate.

FIGURE 6 is a section along the line VI—VI of FIGURE 5.

FIGURE 8 shows the arrangement of the cut out garment-part under the needle.

FIGURE 9 shows the simultaneous feeding of the pocket lining during the sewing operation.

FIGURE 13 is a perspective view of another embodiment of an apparatus for feeding the piping.

FIGURE 14 is a perspective view of the piping folded according to the second method.

FIGURE 15 is a perspective view of a piped opening cut and sewn according to the second method.

FIGURE 16 is a view similar to FIGURE 15, after the piping is drawn upwardly through the slit.

Figure 7:
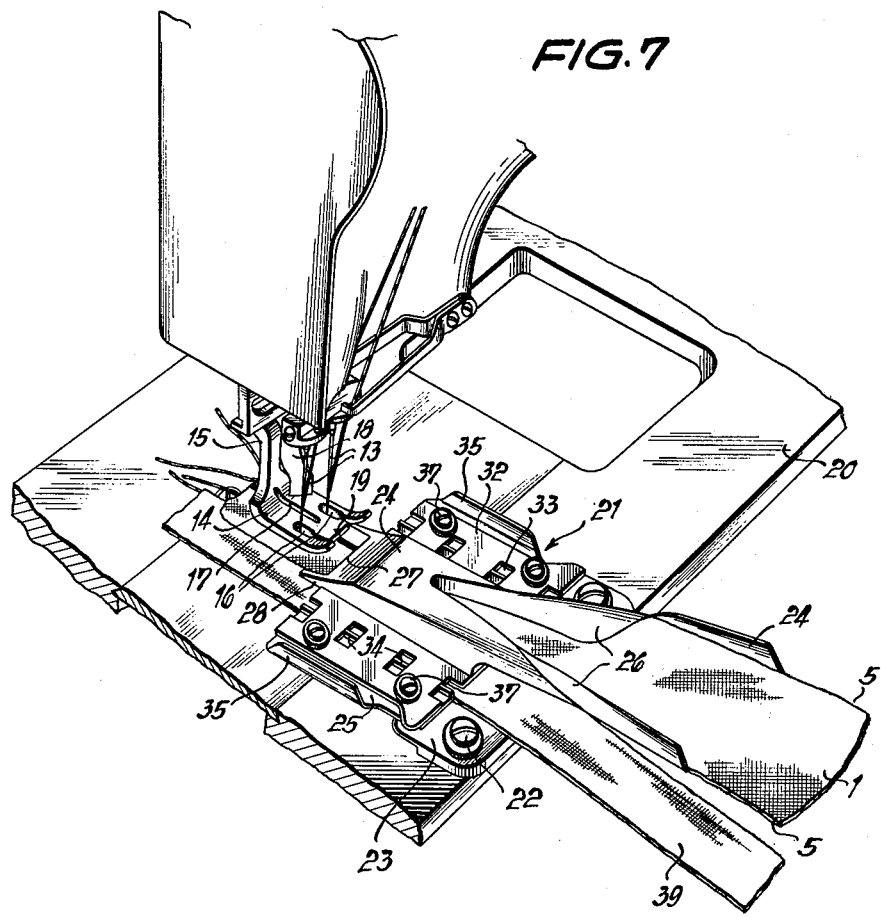
FIGURE 7 is a view similar to that of FIGURE 5 in which both a fed strip and the piping are inserted in the folding apparatus.

In the method shown in FIGURES 1, 2, 3 and 4 a strip of symmetrically folded piping 1 adapted to the length of the opening to be piped is sewn under a cut portion 2 of a garment by two parallel seams or lines of stitching 4 each an equal distance from the folded edges 3. The piping comprises a strip of material which is reduced to half its original width by turning in the edges 5, with the edges disposed on the center line of the strip. Simultaneously with the sewing operation a slit 6 is cut between the two seams 4. It is preferable to make the slit 6 shorter at its ends, by about half the needle clearance, than the parallel seams 4.

Then, in a separate manual operation, the piping ends 7 (FIGURE 2) extending in front of and behind the seams, are completely cut through as an extension of the slit 6. Furthermore, the ends of the slit in the cut portion 2 are each provided with two incisions 8 (FIGURE 1) diverging to the ends of the seam in order to provide wedge-shaped flaps 9, thus forming trapezoidal flaps 10 between the slit 6 and the seams 4.

The piping 1, the seams 4 and the flaps 9 and 10 are then drawn through the opening 11 in the cut-out part and disposed flat on the back thereof (FIGURE 2). Thus the cut portion 2 is given the shape shown in FIGURE 3. The folded edges 3 of the piping 1 then are disposed on the center line of the piped opening, and completely mask the two seams 4. In order to insure their relative positions, the wedge-shaped flaps 9 are connected to the appropriate piping ends 7 below them by lock seams bartacking 12 (FIGURE 4).

The described method includes the basic stages in the sewing of piped openings and corresponds to the making of piped button holes. The formation of pocket slits on garments is substantially identical with the basic steps and differs only in the simultaneous sewing of other parts of material such as are necessary for the shaping of the type of pocket desired.

For practicing the invention a two-needle sewing machine with a cutter arranged vertically between the needles 13 is used as shown in FIGURE 5. The sole plate 14 of the presser foot 15 has a longitudinal slot 17 between the needle openings 16 for the passage of the cutter 18. The cutting plane is indicated by a notch 19 on the front of the sole plate 14 of the presser foot.

A folding device 21 is detachably secured to the carrier plate 20 by screws 22. The folding device 21 comprises the base plate 23, a folding-sleeve 24 and two slides 25. The folding-sleeve 24 has two lateral guide plates 26 which bend up the edges 5 of the fed piping 1 and turn them over to the center.

For lateral guidance of the folded piping as far as the stitch-forming position, the vertical walls of the folding-sleeve 24, behind the outlet 27, are continued as prongs 28 into the vicinity of the sole plate 14 of the presser foot 15.

Connected to the base 29 (FIGURE 6) of the folding-sleeve 24 is a stud 30 which engages a groove 31 of the base plate 23. The base 29 of the folding-sleeve 24 is continued on both sides by horizontal extension plates 32 provided with rectangular apertures 33. The latter are engaged by projections 34 of the slide 25 which are turned up at right angles, one of each of which is located between the lateral extension plates 32 and the base plate 23.

The outwardly extending edge 35 of each slide is turned up to form a handle. Due to the parallel space between the base 29 of the folding-sleeve, and between the extension plates 32 and the base plate 23, a strip guide 36 is formed on each side of the folding apparatus between the stud 30 and the turned up projections 34 of the slides 25.

The extension plates 32 of the folding-sleeve are screwed to the base plate 23 by fixing screws 37 which pass through longitudinal slots 38 in the slides 25. Either slide 25 can be adjusted by loosening the fixing screw 37 and the width of the strip guide 36 is controlled thereby.

In making of piped pockets, such as are used as trouser side pockets, a fed strip 39 (FIGURE 7) is inserted into the left hand strip guide 36 before sewing begins and the piping 1 is inserted into the folding-sleeve 24, whereupon both parts are advanced until their front edges are just behind the presser foot 15. The cut garment portion 2 is then disposed under the presser foot 15 (FIGURE 8) so that the transverse mark 40, indicating the beginning of the opening to be piped, is directly below the insertion point of the needles 13. The beginning of the longitudinal marks 41 is then brought into alignment with the notch 19 in the presser foot. Preferably the piping 1 consists of the same material as the cut garment portion 2, whilst for the strip 39 an ordinary commercial tape with a strong woven edge may be used. Finally the pocket lining 42 (FIGURE 9) with the edge of material to be sewn on the piped opening, is applied to the longitudinal marks. The exact position of the edge of material 43, with regard to its alignment relative to the longitudinal direction of the piped opening, can also be indicated by marks (not shown) or shown by the shape of the cut out pocket lining 42 as in FIGURE 9. In this case the edge 44 of the initially cut flap 45 coincides with the transverse marks 46 which indicate the end of the piped opening.

After the alignment of the individual parts of material on the sewing machine, the operator sews a short piece of a length corresponding to about half the needle clearance. The operator then operates the cutter 18 in a known manner so that, as sewing proceeds, the layers of material between the two seams 4 are cut through. The operator holds the edge 43 of the pocket lining 42 against the longitudinal marks 41 and while continuing to sew, guides all the layers by these marks under the notch 19 in the presser foot 15 to the stitch-forming position. Approximately at a distance of half the needle spacing or clearance from the transverse marks at the end of the piped opening, the cutter 18 is switched off and a few more stitches are sewn until the transverse marks 46 are under the place where the needle is inserted. If preferred, the point where the cutter is switched on and off can be marked by two more lines.

Figure 10:
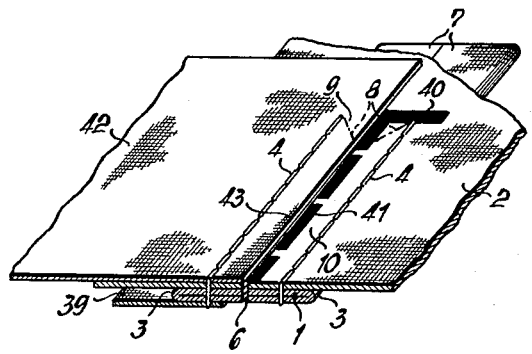
FIGURE 10 is a perspective view of the sewn and cut piped opening for pockets.
Figure 11:
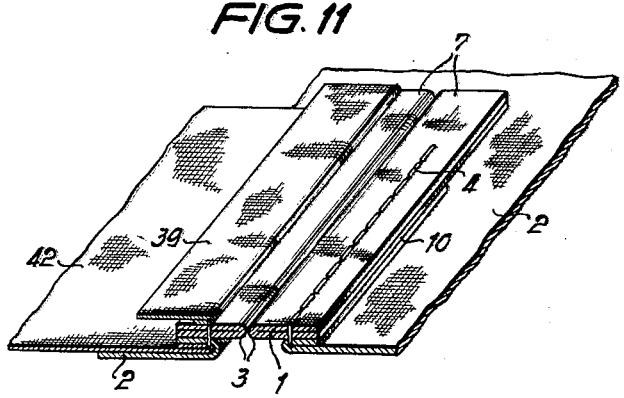
FIGURE 11 is a view similar to FIGURE 10, after the piping, including the strip sewn therewith is drawn upwardly through the slit and turned over on both sides.
Figure 12:
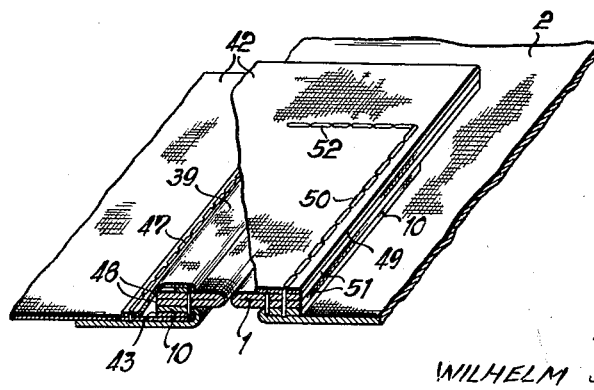
FIGURE 12 is a view corresponding to FIGURE 11, after the completion of the pocket opening.

FIGURE 10 shows the layers sewn and cut by the sewing machine. As already described above, the piping ends 7 extending in front of and behind the seams 4 are completely cut through by hand, in a separate operation, as a continuation of the slit 6 and, after the making of the diverging incisions 8 at the ends of the slit 6 in the cut garment portion 2 and in the pocket lining 42, the piping 1, including the tape 39, cut to the corresponding length, is drawn through the slit 6, so that the portions of material assume the position shown in FIGURE 11. The tape 39 is then sewn with the seam 47 (FIGURE 12) to the pocket lining 42 and thus covers both the edges 48 of piping material below it and also the edge 43 of the pocket lining 42 and the edge of the flap 10. The edge 49 of the pocket lining, which is opposite the edge 43 of the pocket lining sewn to the piped opening, is turned over and sewn with a seam 50 to the edges 51 of piping 1 and the turned over flap 10 of the cut out part 2. The projecting piping ends 7 (FIGURE 11) are connected by a lock seam 52 with the flap 9 of the cut out part 2 under them (FIGURE 10) and to the pocket lining 42.

FIGURES 13–16 show a device and an operation for a somewhat modified method of manufacturing piped pockets.

The folding device 21 is replaced by a seam like folding device 53 of a type similar to a seamer. As shown in FIGURE 13, this device mainly comprises a plate 54 which, due to the bending over of the edges 55, 56, 57, has a snail-like shape while the open space in front of the edge 57 is limited by an abutment 58. The bottom of the plate 54 is enlarged at the front by a support 59 for the material. Connected to the edge 56 is an extension 60 terminating in a limiting boundary wall 61. For better insertion of the material the extension 60 is provided with a slot 62 and the upper side of the plate 54 with a slot 63. Two metal lugs 64 on the bottom of the folding device 53 are used to attach it to the material supporting plate 20 of the sewing machine.

When the piping 65 (FIGURE 14) is inserted in the folding device 53, it is folded twice in the same direction in a marginal zone 66 producing folded edges 67, 68 and the turned-over edge of material 69 is disposed between the edges 67, 68.

After the piping 65 is inserted in the folding device 53, the portions of material are sewn together and cut through by the sewing machine, after the cut portion 2 (FIGURE 15) and the pocket lining 42 are laid over it and aligned, in the same manner as already described in the first embodiment of the apparatus. The operation of pulling the piping 65 through and the further work on the piped opening are also effected in the manner which has already been described.

The strip 70 of material (FIGURE 16) resulting after the cutting, from the portion of piping 65 which has not been turned over, serves to cover the edge of material 71 after the piping 65 has been drawn through the piped opening.

The folding apparatus may have a guide, preferably resilient, for the pocket lining.

Having now described my invention with reference to the embodiments illustrated in the drawings, I do not wish to be limited thereto, but what I desire to protect by Letters Patent is set forth in the appended claims.

I claim:

1. Method of making piped openings in garment portions or the like on a two needle sewing machine comprising the steps of folding piping material fed flat into a folding device disposed on the sewing machine to form two folded edges, placing a garment portion over the folded piping material, machine sewing the folded piping material to the bottom side of said garment portion by means of two seams while the folding in said device continues and simultaneously cutting a slit in said garment portion and through the piping material intermediate the seams along an indicating line on the top side of the garment portion exposed to the vision of the machine operator, forming in the garment portion incisions diverging from the ends of said slit, and drawing portions of the piping through the opening formed by the slitting operation.

2. Method of making piped openings in garment portions or the like on a two needle sewing machine comprising the steps of folding piping material fed flat into a folding device disposed on the sewing machine to form adjacent straight edges, placing a garment portion over the folded piping material, machine sewing the folded piping material to the bottom side of said garment portion by means of two seams while the folding in said device continues and simultaneously cutting a slit in said garment portion and through the piping material intermediate the seams along an indicating line on the top side of the garment portion exposed to the vision of the machine operator, forming in the garment portion incisions diverging from the ends of said slit, drawing portions of the piping through the opening formed by the slitting operation, and bartacking the garment portion and piping together transversely of the end of said slit.

3. Method of making piped openings in garment portions or the like on a two needle sewing machine comprising the steps of forming two folded edges in piping material fed flat into a folding device on a sewing machine by folding the marginal area of the material twice in the same direction, thereby locating one edge of the folding material between said two folded edges, placing a garment portion over the folded piping material, machine sewing the folded piping material to the bottom side of said garment portion by means of two seams while the folding in said device continues and simultaneously cutting a slit in said garment portion and through the piping material intermediate the seams along an indicating line on the top side of the garment portion exposed to the vision of the machine operator in a maner that said one edge of material is located between two seams while the other edge extends beyond one of said folded edges, forming in the garment portion incisions diverging from the ends of said slit, and drawing portions of the piping through the opening formed by the slitting operation.

4. A method of making a pocket with a piped opening in a garment portion on a two needle sewing machine comprising the steps of folding piping material fed flat into a folding device disposed on the sewing machine to form adjacent straight edges, placing a garment portion over the folded piping material, machine sewing the folded piping material to the bottom side of said garment portion by means of two seams while the folding in said device continues and simultaneously cutting a slit in said garment portion and through the piping material intermediate the seams along an indicating line on the top side of the garment portion exposed to the vision of the machine operator, manually guiding a pocket lining on the free side of the garment portion while said two seams are sewn in a manner that one edge of said lining rests against the indicating line, and simultaneously sewing one end of a tape under the piping with one of the needles, said one end of said tape being disposed between the seam produced by said one needle and the cutting line, forming in the garment portion incisions diverging from the ends of said slit, drawing portions of the piping through the opening formed by the slitting operation, and bartacking the garment portion and piping together transversely of the end of said slit.

(References on following page)

References Cited in the file of this patent

UNITED STATES PATENTS

| | | |
|---|---|---|
| 1,832,214 | Jenkins | Nov. 17, 1931 |
| 2,529,072 | Bradford et al. | Nov. 7, 1950 |
| 2,549,294 | Demarco | Apr. 17, 1951 |
| 2,676,557 | Silverberg | Apr. 27, 1954 |
| 2,767,673 | Gough | Oct. 23, 1956 |
| 2,780,193 | Smith et al. | Feb. 5, 1957 |
| 2,885,981 | Dressler et al. | May 12, 1959 |